United States Patent
Mirov

(10) Patent No.: US 8,909,207 B1
(45) Date of Patent: Dec. 9, 2014

(54) PROXIMAL DEVICE CONFIGURATION METHOD AND SYSTEM

(75) Inventor: Russell Mirov, Los Altos, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/425,920

(22) Filed: Mar. 21, 2012

Related U.S. Application Data

(60) Provisional application No. 61/468,915, filed on Mar. 29, 2011.

(51) Int. Cl.
    *H04M 3/00* (2006.01)
(52) U.S. Cl.
    USPC ........................... 455/418; 340/10.51
(58) Field of Classification Search
    CPC ..... H04W 4/005; H04W 4/006; H04W 4/008; H04W 4/04; H04W 4/043; H04W 64/00; H04W 64/003; H04W 64/006
    USPC ................................. 455/418–420
    See application file for complete search history.

(56) References Cited

U.S. PATENT DOCUMENTS

| | | |
|---|---|---|
| 2004/0002305 A1* | 1/2004 | Byman-Kivivuori et al. ............... 455/41.2 |
| 2004/0036611 A1* | 2/2004 | Kidney et al. ............... 340/573.1 |
| 2005/0099269 A1* | 5/2005 | Diorio et al. ............... 340/10.51 |
| 2005/0136845 A1* | 6/2005 | Masuoka et al. ............ 455/67.14 |
| 2006/0287001 A1* | 12/2006 | Budampati et al. ......... 455/552.1 |
| 2007/0171051 A1* | 7/2007 | Kashiwagi et al. ........ 340/539.22 |
| 2009/0237223 A1* | 9/2009 | Zimmerman et al. ...... 340/10.51 |
| 2011/0074582 A1* | 3/2011 | Alexis ........................ 340/572.1 |

\* cited by examiner

*Primary Examiner* — Jinsong Hu
*Assistant Examiner* — Erica Navar
(74) *Attorney, Agent, or Firm* — Dority & Manning, P.A.

(57) ABSTRACT

Systems and methods for configuring proximally configurable devices deployed to a location using a proximal device configuration tool. The proximal device configuration tool generates a directed beam that is sent to a targeted proximally configurable device where the proximally configurable device enters a configuration mode and received configuration information associated with a context using the directed beam.

33 Claims, 5 Drawing Sheets

PROXIMAL DEVICE CONFIGURATION METHOD AND SYSTEM

CROSS REFERENCE TO RELATED APPLICATIONS

This application claims the benefit of U.S. Provisional Application No. 61/468,915 filed Mar. 29, 2011, which is hereby incorporated by reference in its entirety.

BACKGROUND

1. Field

Embodiments relate generally to the field of indoor location based information systems.

2. Background

Typical location based information systems depend on global positioning systems (GPS) to determine a geographic location and a remote database that contains information associated with a particular geographic location. However, GPS receivers generally rely on navigation signals broadcasted by satellites orbiting the Earth. Therefore, such receivers require an unobstructed line of sight to the satellites in order to provide reliable location information. Thus, GPS is typically used to establish locations in outdoor environments only and may not be suitable to indoor locations. However, indoor positioning systems (IPS) have been developed to locate and track objects within indoor environments, such as office buildings. Such systems generally use various wireless transmissions, for example, infrared (IR) or ultrasound signals, for location and tracking purposes.

However, existing solutions for indoor positioning require sophisticated infrastructures be deployed within an interior space of a building. For example, these solutions may require special wiring be installed in the building and/or an architectural analysis of the interior space be performed for purposes of mounting necessary equipment. Further, any devices used in such a solution may have to be configured prior to shipment, or at an early stage of assembly with at least some type of identification such as a pre-configured serial number or identifying token.

BRIEF SUMMARY

Embodiments relate to methods and systems for configuring proximal devices in-situ. By allowing a proximal device to be configured on-site, rather than at the point of manufacture, the proximal devices can be manufactured as identical components. Embodiments provide a capability to configure proximal devices in-situ using a directed beam that also places the proximal devices into a configuration mode.

In an embodiment, a plurality of proximally configurable devices are deployed to multiple locations. A targeted proximal device is configured, after being deployed, using a directed beam. In order to be configured, the targeted device enters a configuration mode based on instruction information contained within the directed beam. Configuration information associated with a context is then sent while the targeted proximal device is in the configuration mode.

In another embodiment, a targeted one of a plurality of proximally configurable devices receives information sent over a directed beam by a configuration device where instruction information places the targeted proximal device into a configuration mode. The targeted proximal device then receives configuration information associated with a context, while the targeted proximal device is in the configuration mode.

In yet another embodiment, a system for proximal device configuration includes a configuration tool and a targeted proximally configurable device. The configuration tool generates a directed beam, where instruction information is contained within the directed beam that instructs the targeted proximally configurable device to enter a configuration mode. In the configuration mode the configuration tools send configuration information associated with a context to the targeted proximally configurable device.

Embodiments may be implemented using hardware, firmware, software, or a combination thereof and may be implemented in one or more computer systems or other processing systems.

Further embodiments, features, and advantages of the present invention, as well as the structure and operation of the various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS/FIGURES

Embodiments of the invention will now be described, by way of example only, with reference to the accompanying drawings in which corresponding reference symbols indicate corresponding parts. Further, the accompanying drawings, which are incorporated herein and form part of the specification, illustrate the embodiments of present invention and, together with the description, further serve to explain the principles of the invention and to enable a person skilled in the relevant art(s) to make and use the invention.

Figure 1:
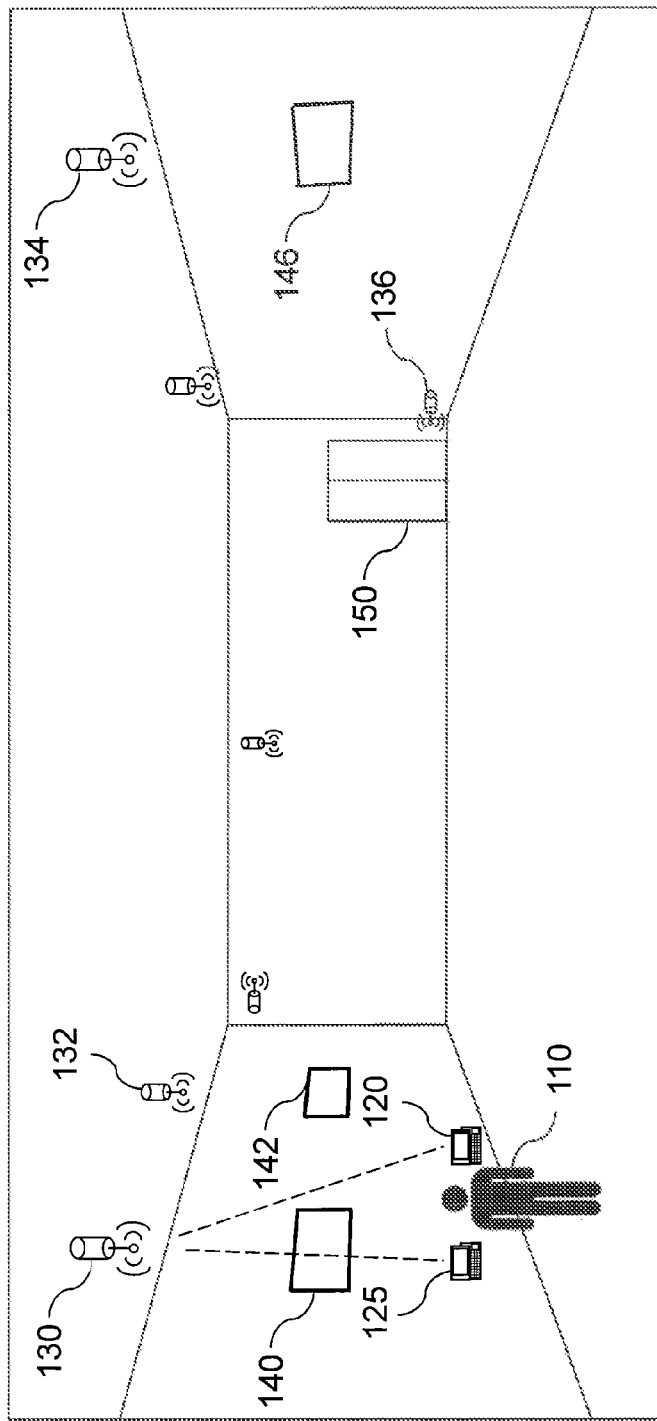
FIG. 1 is a diagram of an embodiment of an example of placement of multiple proximal devices in an interior space.

The features of various embodiments will become more apparent from the detailed description set forth below when taken in conjunction with the drawings, in which like reference characters identify corresponding elements throughout. In the drawings, like reference numbers generally indicate identical, functionally similar, and/cm structurally similar elements. The drawing in which an element first appears is indicated by the leftmost digit(s) in the corresponding reference number.

DETAILED DESCRIPTION

Embodiments relate to proximal device configuration, and are also referred to as beaconing devices. While illustrative embodiments are described herein with reference to particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to affect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

I. SYSTEM

FIG. 1 is a diagram of an embodiment of an exemplary system 100 of multiple proximal devices and proximate items of interest located in an interior space. In the example shown in FIG. 1, system 100 includes a user 110, a proximal device configuration tool 125, a mobile communication device 120, and proximally configurable devices 130, 132, 134 and 136. The system may further include objects of interest 140, 142 and 146, and a doorway 150.

Although proximally configurable devices 130, 132 and 134 are labeled, FIG. 1 illustrates additional proximally configurable devices. There is no restriction as to the number or location of such proximally configurable devices. For example, a proximally configurable device can be located on a ceiling, a wall, or in the floor, in any orientation. Although FIG. 1 illustrates an indoor space, proximally configurable devices can be located outdoors as well in an embodiment. In an embodiment, proximally configurable devices 130, 132, 134 and 136 are beacon tags used to transmit information within a limited area. For example, user 110 could be viewing object of interest 140 that is located in proximity to proximally configurable device 130, and may be interested in additional information concerning object of interest 140. In an embodiment, by using mobile communication device 120, the user can receive additional information concerning object of interest 140 that is transmitted from proximally configurable device 130 where such information is stored within memory in proximally configurable device 130. The stored information can include additional information concerning object of interest 140 such as location, detail features, history, in-depth description, sales price, or any other possible associated information.

Proximally configurable devices from which mobile communication device 120 can receive signals may depend on factors such as the location of mobile device 120, and user 110, within the interior space relative to a proximally configurable device. For example, in an embodiment, user 110 could proceed to object of interest 142. In so doing, user 110 would be able to receive information from proximally configurable device 132. The received information could include information regarding object of interest 132, also referred to as a context, using mobile communication device 120. In a similar manner user 110 could proceed to object of interest 146 and receive context information from proximally configurable device 134 through mobile communication device 120 concerning object of interest 146. In an embodiment, user 110 may receive information about an object of interest from the proximally configurable device most proximate to the object or from another proximally configurable device. In an embodiment, user 110 may receive information from multiple proximally configurable devices.

Context information can include a variety of information. For example, in a retail store setting a context can include inventory level information regarding specific products, or the context could refer to pricing information, e.g., a sale, as well as the location of a product within a store, e.g., aisle 3, section 2, shelf 1, or even location coordinate information, e.g., latitude, longitude, and/or elevation. Additional contexts can include information such as how an item is used, the nutritional value of a food item, historical information, and the like. There is no limitation or restriction associated with context information.

Context information can also refer to information associated with a geographic location. For example, in an embodiment, proximally configurable device, such as proximally configurable device 136 contains geographic based context information. For example, if user 110 proceeds to exit the room through doorway 150, proximally configurable device 136 transmits context information to mobile communication device 120 regarding logistical information such as the name of the street located on the other side of the doorway, directions to other nearby attractions, or the user's location, or any other information that may be desirable to pass on to user 110 before user 110 leaves the current room. As an example, proximally configurable device 136 is shown mounted on a wall close to a floor. As previously mentioned, there is no restriction as to the location of a proximally configurable device. In addition, there is no restriction as to the type of information stored within each proximally configurable device.

Context information associated with a particular proximally configurable device may also be altered at any time. For example, a particular proximally configurable device may be associated with a store aisle that contains food, where the context is the nutritional value of a certain food item. At some point the store aisle may change how it is being stocked and may no longer hold food items, but rather a hard good, e.g., a set of towels. The context information in the proximally configurable device associated with that aisle would simply be updated to contain a new set of context information, now relating to the new item on the shelf, e.g., the set of towels.

The arrangement of the proximally configurable devices, including proximally configurable devices 130, 132, 134 and 136, within the interior space shown in FIG. 1 provides only one example of an arrangement of proximally configurable devices within a space. Any number of arrangements, indoors or outdoors, may be used as necessary.

Mobile communication device 120 communicates with a plurality of proximally configurable devices 130, 132 and 134. Mobile communication device 120 can be any type of mobile computing device having one or more processors, a memory, a user input (for example, QWERTY keyboard, touch-screen, microphone, or a T9 keyboard), and a communications infrastructure capable of receiving and transmitting data over a network. Software may include one or more applications and an operating system. Hardware can include, but is not limited to, a processor, memory and graphical user interface display. For example, mobile device 102 can include, but is not limited to, a mobile phone, a personal digital assistant (PDA), a laptop computer, a tablet computer, a netbook computer, or other similar type of mobile device capable of processing instructions and receiving and transmitting data.

Mobile communication device 120 is broadly defined to include any type of device that can be mobile with the ability to communicate. For example, mobile communication device 120 can include devices such as a robot, a vehicle, or any other type of mobile device with communication capabilities.

In another embodiment, a non-mobile device (not shown) communicates with a plurality of proximally configurable devices 130, 132 and 134. Such a non-mobile device can include devices such as an asset that is desired to be tracked, or a rarely moved item, e.g., a copying machine.

Although not shown in FIG. 1, mobile communication device 120 is capable of communicating with one or more servers over a network. Such servers can be implemented using any general-purpose computer capable of serving data to mobile communication device 120. The network can be any network or combination of networks used to communicate information between different computing devices. Such network can include, but is not limited to, a wired (e.g., Ethernet) or a wireless (e.g., Wi-Fi and 3G) network. In addition, such network can include, but is not limited to, a local area network, medium area network, and/or wide area network such as the Internet.

In an embodiment, each proximally configurable device may be manufactured without any specific, unique programming or information, e.g., site specific information that would be transmitted to a user as described above. In such a scenario no special configuration or pre-programming is necessary prior to installation or placement of an individual proximally configurable device.

In an embodiment, each proximally configurable device may be manufactured without any specific site related information, but may include other programming, e.g., unit serial number, date code, model number, etc.

In an embodiment, proximally configurable devices are relatively small, e.g., 1"×¾"×¼", and are expected to continue to decrease in size, approaching approximately 3 mm×3 mm×1 mm and operate using either stored power or ambient light as a power source. In an embodiment, because the proximally configurable devices are so small they lack typical physical connections and thus communicate through non-contact mediums such as through radio frequency (RF) and/or optical methods. The transmission range of the proximally configurable devices is also limited due to the small size and power capabilities and therefore typically operates in the 1-2 meter range.

In another embodiment, each proximally configurable device derives its power through energy that is delivered to the device during configuration. In such a situation, both power and configuration data are transferred to the device during the configuration process. In another embodiment, each proximally configurable device obtains power through an external source such as ambient light, radiation from a point source or fixture, e.g., a light fixture, or other energy source, e.g., thermal, RF, vibration, electromagnetic, pressure, etc.

In an embodiment, each proximally configurable device operates independently in the sense that configuration and operating of one device is separate and distinct from the configuration and operation of another device. Typically, each proximally configurable device is located such that a user would only be able to receive a transmission from a single proximally configurable device at any point in time as illustrated in FIG. 1 where user 110, at the location shown, can receive a signal from proximally configurable device 130, but not from proximally configurable devices 132, 134 and 136.

Configuration of each of the proximally configurable devices may also be accomplished independently, according to an embodiment. As such, each proximally configurable device can be configured with information unique to a particular proximally configurable device. FIG. 1 illustrates a user 110 with proximal device configuration tool 125 that can be used for in-situ configuration, according to an embodiment. FIG. 1 shows eight (8) different proximally configurable devices that have been located throughout a room. In an embodiment, all eight (8) devices are essentially identical and contain no information relating to their installed location, at the time of installation. Proximal device configuration tool 125 is used to connect individually with each proximally configurable device in order to upload information to the device that the device stores and can later transmit a portion, or the entire amount, of information where users, via mobile communication devices, can receive the transmitted information when those users are within the broadcasting range of the proximally configurable device.

In an embodiment, proximal device configuration tool 125 can send a directed beam, e.g., a laser beam, to proximally configurable device 130 in order to place proximally configurable device 130 into a programming mode in which information in proximal device configuration tool 125 can be uploaded and stored in proximally configurable device 130 for later retrieval by another device, such as mobile communication device 110. In a similar manner, proximal device configuration tool 125 can be directed to send a directed beam to proximally configurable device 132 in order to place proximally configurable device 132 into a programming mode in which information in proximal device configuration tool 125 can be uploaded and stored in proximally configurable device 132 for later retrieval by another device, such as mobile communication device 110. This process can be repeated until all the desired proximally configurable devices have been programmed to store the desired information in each device. The stored information can be unique in each proximally configurable device, but there is no such requirement that the information must be unique.

In an embodiment, proximally configurable device 130 monitors the environment for the presence of a beam or signal. In an embodiment, upon detecting such a beam the proximally configurable device can receive instruction information within the directed beam that instructs proximally configurable device 130 to enter a configuration mode. Once in the configuration mode, proximally configurable device 130 can receive configuration information, where such configuration information can be uploaded through the directed beam. In another embodiment, proximally configurable device 130 monitors the environment for the presence of a beam or signal, but will only enter a configuration mode after receiving the instruction information if the power level, or strength, of the directed beam is above a certain threshold. For example, proximally configurable device 130 can monitor the environment for the presence of light where light e.g., a flash unit, is used to convey configuration information. However, proximally configurable device 130 is designed to enter a configuration mode only if the light is bright, e.g., over 500 lumens, otherwise proximally configurable device 130 will not enter a configuration mode, even if a proper set of instruction information is received. In an embodiment, instruction information is not required to enter into the configuration mode, but rather the detection of a directed beam with a power level above a threshold is sufficient to instruct proximally configurable device 130 to enter the configuration mode. Proximally configurable device 130 can generate and transmit confirmation information that the configuration mode has been entered. Further, the transmitted confirmation information can also include a confirmation that the information sent to proximally configurable device 130 was correctly applied to proximally configurable device 130.

Figure 2:
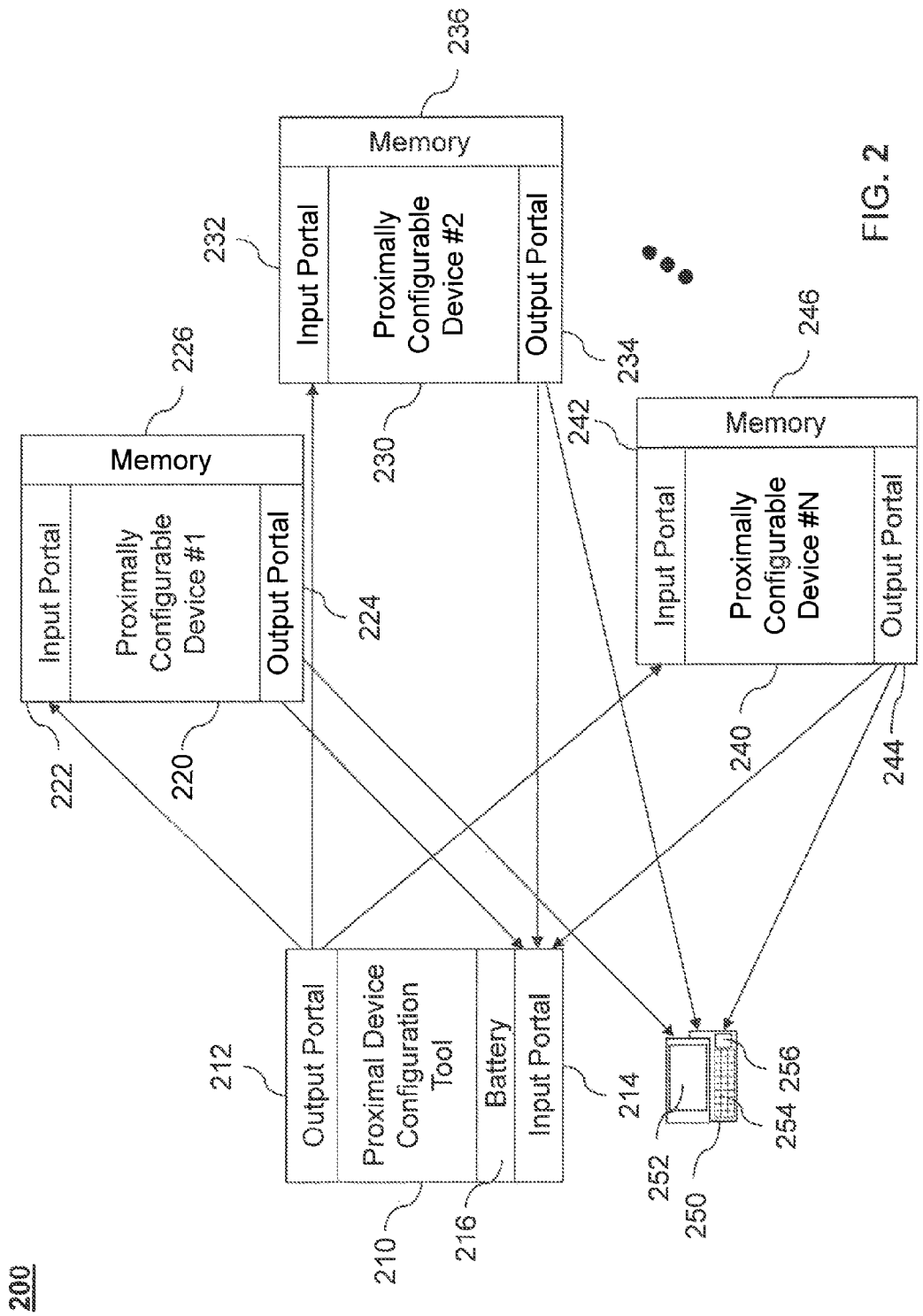
FIG. 2 is a diagram of an embodiment of an exemplary system for the configuration of proximal devices including a proximal device configuration tool and a mobile communication device.

FIG. 2 is a diagram of an embodiment of an exemplary system 200 that includes a set of proximally configurable devices 220, 230 and 240 with a proximal device configuration tool 210 and a mobile communication device 250. As mentioned previously, it should be noted that any number of proximally configurable devices may be used as necessary as indicated by proximally configurable device 240 labeled "Proximally Configurable Device #N" where N is an integer greater than 1. In the example shown in FIG. 2, proximal device configuration tool includes an output portal 212 and an input portal 214 as well as other components apparent to a person skilled in the art that may include additional components, modules, and/or sub-components as may be necessary. Proximally configurable devices 220, 230 and 240 include input portals 222, 232, and 242 respectively, output portals 224, 234, and 244 respectively, and memories 226, 236, and 246, respectively. Mobile communication device 250 includes a display 252, input keyboard 254, and pointing device 256.

In an embodiment, proximally configurable devices 220, 230 and 240 include one or more input portals, e.g., 222, 232 and 242. Each input portal can receive communications from another device, such as proximal device configuration tool 210. Each input portal can be configured to receive one or more types of communications medium including communications utilizing one or more mediums including, but not limited to optical, RF, electromagnetic, acoustic, pressure, and/or temperature. Furthermore, each input portal may receive communications using multiple types of medium.

In an embodiment, proximally configurable devices 220, 230 and 240 include one or more output portals, e.g., 224, 234 and 244. Each output portal offers a non-contact device for sending communications to another device, such as proximal device configuration tool 210 or mobile communication device 230. Each output portal can be configured to transmit one or more types of communications including communications utilizing one or more mediums including, but not limited to optical, RF, electromagnetic, acoustic, and pressure. Furthermore, each output portal may transmit communications using multiple types of medium.

Input and output portals do not have to communicate using the same medium, according to an embodiment. For example, proximally configured device 220 can receive communications using input portal 222 where such communications are optically based, such as a laser, but transmit communications using output portal 224 where the outgoing communications are RF based.

Memories 226, 236 and 246 in proximally configurable devices 220, 230 and 240 respectively, store configuration information as well as information to be transmitted, according to an embodiment. Proximal device configuration tool 210 transfers information from output portal 212 to an input portal of a proximally configurable device, e.g., input portal 222 of proximally configurable device 220. This may be accomplished by proximal device configuration tool 210 transmitting a configuration enabling sequence, e.g., instruction information, to a proximally configurable device whereby the device recognizes the data as configuration data. In an embodiment, proximal device configuration tool 210 can also include an internal power source, such as battery 216. Proximal device configuration tool 210 can be any type of device with the ability to generate any type of non-contact medium. In an embodiment, proximal device configuration tool could include a mobile phone with an embedded flash unit where the flash unit can be triggered in a certain sequence to convey configuration data, or any other information, to a proximally configurable device.

Such configuration data can include for example, whether the proximally configurable device should operate in a passive or active mode, according to an embodiment. In an embodiment, a passive mode is where the proximally configurable device is configured to transmit a communication from its output portal without a specific request, e.g., from detector or other device, but rather bases the decision to transmit information based on another factor, such as time, e.g., every 1 minute or on a continuous basis, which may occur at predetermined, regular or irregular intervals. In another embodiment, a passive mode is configured to be where the proximally configurable device senses a user, e.g., sensing a temperature, pressure or electromagnet radiation, and based on that detection transmits a communication from its output portal. In an embodiment, an active mode can be configured such that a proximally configured device transmits information from its output portal only upon the receipt of some type of communication by its input portal. Proximal device configuration tool 210 can also configure a proximally configurable device to operate in a hybrid active/passive mode responding to specific requests for information while also sending information based on a detection or time base as described above.

Configuration data can also include information associated with a context as previously described.

Mobile communication device 250 receives transmissions from an output portal of a proximally configurable device, e.g., 224, 234, or 244, in an embodiment. In an embodiment, mobile communication device 250 then displays the communicated information, e.g., information associated with a context, on screen 252.

Proximal device configuration tool, in an embodiment, has the ability to charge a proximally configurable device during configuration. In an embodiment, this transfer of power during configuration is the only source of power for a proximally configurable device. For example, proximal device configuration tool 210 communicates with proximally configurable device 220 by producing a laser beam in output portal 212. In another embodiment, proximal device configuration tool 210 communicates with proximally configurable device 220 by pulsating a light emitting diode (LED) beam in output portal 212. The laser, or LED, are examples of using light as a non-contact medium, to not only carry the information to be transferred to proximally configurable device 220, but the light itself can be a source of energy. Input portal 222 receives the light and retrieves the imposed information and also uses the light as a source of energy to charge its batteries (not shown).

II. METHOD

Figure 3:
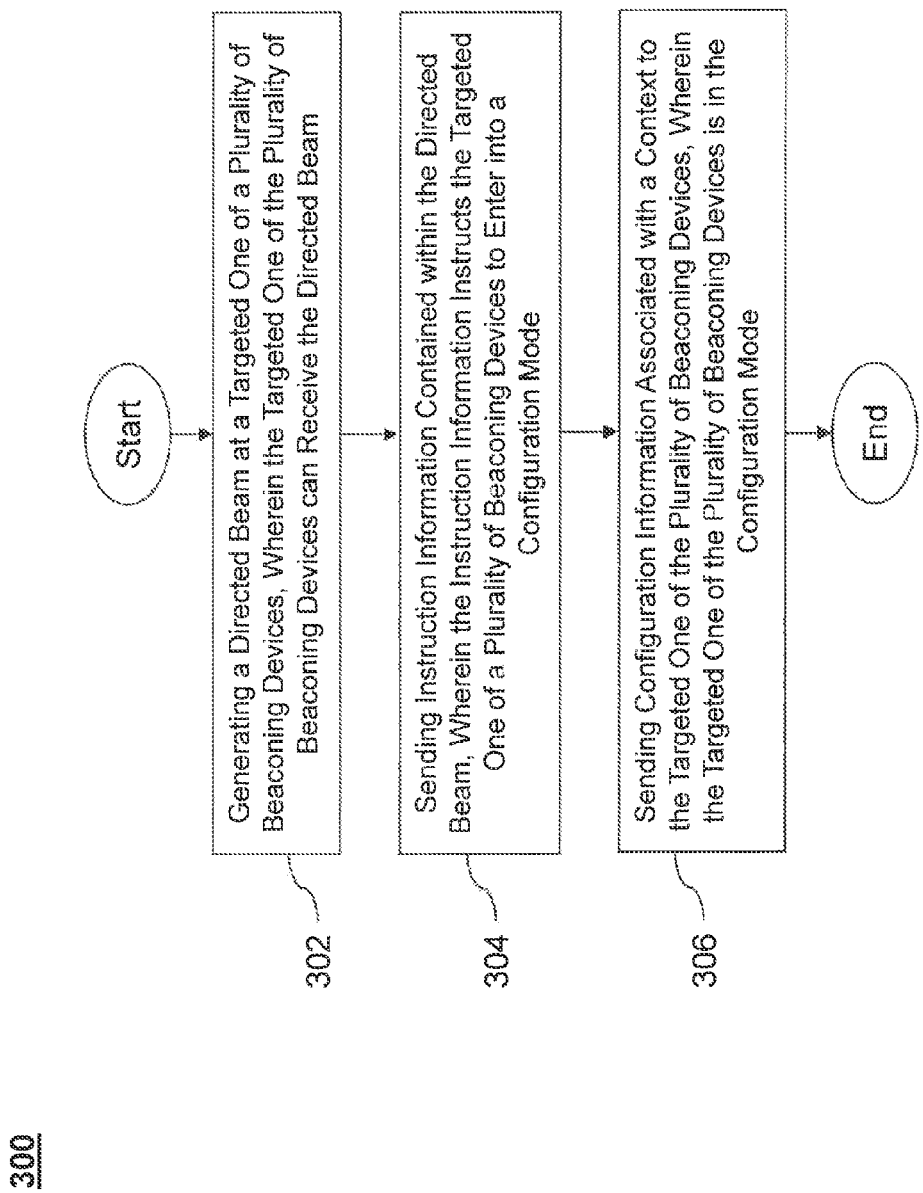
FIG. 3 is a process flowchart of an exemplary method for configuring deployed proximally configurable devices, according to an embodiment.

FIG. 3 is a process flowchart of an exemplary method 300 for configuring a plurality of proximally configurable devices, according to an embodiment. Method 300 includes steps 302, 304, and 306. For ease of explanation, system 100 of FIG. 1 and proximal device configuration tool 120, as described above, will be used to describe method 300, but is not intended to be limited thereto.

Method 300 begins in step 302, in which a directed beam is generated and sent to a targeted one of a plurality of beaconing devices, wherein the targeted one of the plurality of beaconing devices can receive the directed beam. FIG. 1 illustrates the placement of a plurality of proximally configurable devices, e.g., beaconing devices, in an interior space. The number and placement of proximally configurable devices in FIG. 1 is exemplary only. Exact placement of each proximally configurable device may be dependent upon the application in which the devices are intended to be used. FIG. 1 illustrates the example of placing three proximally configurable devices, e.g., 130, 132 and 134, each one near an object of interest in which each proximally configurable device can be configured to store a context, e.g., information relating to each of the respective objects of interest. In addition, proximally configured device 136 is located next to a doorway leading to another location and can be configured to transmit information related to a user proceeding through the doorway (e.g., into or out of a room or area).

The targeted beaconing device, prior to initially being configured, typically contains no unique indentifying configuration data. For example, in an embodiment each of the deployed proximally configurable devices has not yet been configured and as such each device is essentially identical to the others. Once a beaconing device is placed at the desired location, that device can be configured with information applicable to the deployed location e.g., a context associated with a particular beaconing device. As described above, a proximal device configuration tool can be used to configure each unit where the information conveyed to each unit may be unique, but is not required to be unique. Configuration may be accomplished using a directed beam that can include any method of transmission that is not a physical connection, especially given that the proximally configurable devices can be too small to readily be configured with physical contacts.

Method 300 proceeds to step 304, which includes sending instruction information contained within the directed beam, wherein the instruction information instructs the targeted one of a plurality of beaconing devices to enter into a configuration mode. For example, the directed beam is detected and determined to include information within the directed beam. The directed beam provides a medium for the transmission of information as well as to optionally provide power to the beaconing device. Therefore, the configuration process is initiated by the sending of instruction information to the beaconing device instructing the beaconing device to enter a configuration mode. In addition, a beaconing device may optionally be set to detect instruction information within the directed beam if the strength or power level of the directed beam is above a certain pre-defined threshold. In another example, the beaconing device can enter the configuration mode based on the sending of a directed beam with a strength or power level greater than a threshold, without the beaconing device having to detect or decode instruction information.

Method 300 proceeds to step 306, which includes the sending of configuration information associated with a context to the targeted one of the plurality of beaconing devices, which includes sending configuration information associated with a context to the targeted one of the plurality of proximally configurable devices, wherein the targeted one of the plurality of proximally configurable devices is in the configuration mode. For example, the directed beam contains configuration information that is associated with a context as previously discussed where the context can include information associated with any topic including retail related information such as inventory, pricing, location, and usage. In addition, context information can apply to geographic and location based information.

Figure 4:
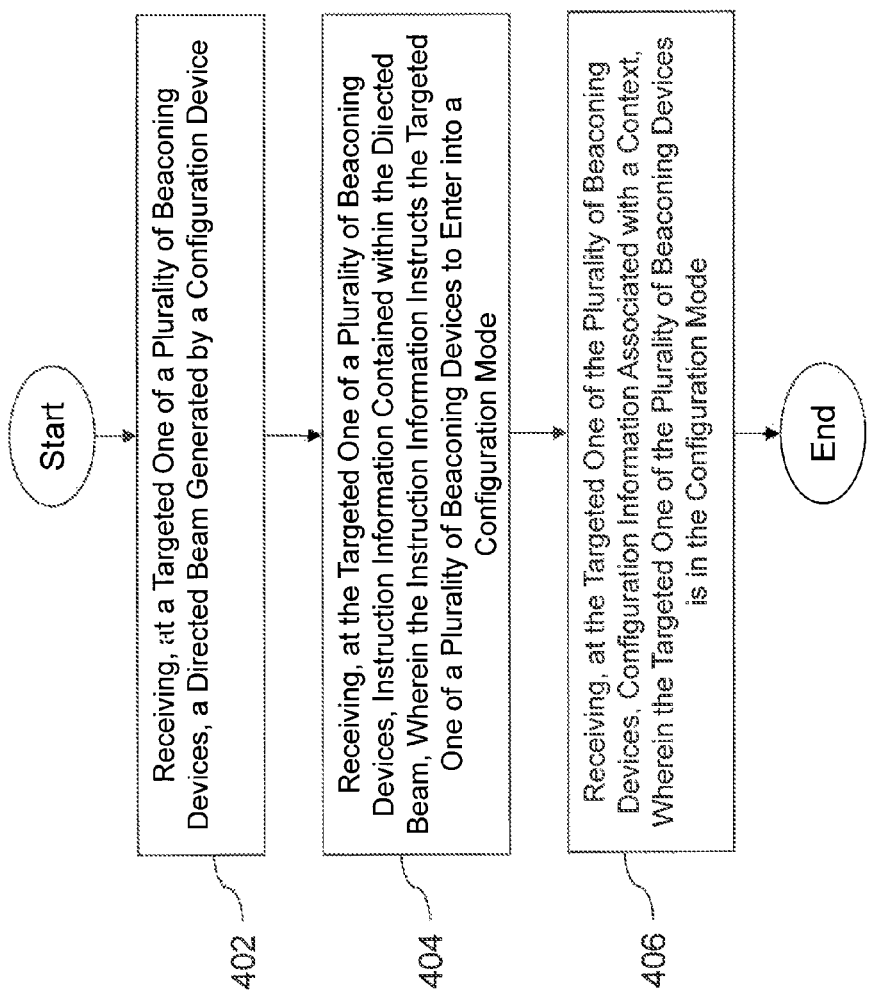
FIG. 4 is a process flowchart of an exemplary method for receiving, by proximally configurable devices at an installed location, configuration data, according to an embodiment.

FIG. 4 is a process flowchart of an exemplary method 400 for configuring a plurality of proximally configurable devices, according to an embodiment. Method 400 includes steps 402, 404, and 406. For ease of explanation, system 100 of FIG. 1 and proximal device configuration tool 120, as described above, will be used to describe method 400, but is not intended to be limited thereto.

Method 400 begins in step 402, in which a directed beam generated by a configuration device is received at a targeted one of a plurality of proximally configurable devices. FIG. 1 illustrates the placement of a plurality of proximally configurable devices, e.g., beaconing devices, in an interior space. FIG. 1 illustrates the example of configuration tool 120 generating a directed beam, shown by the dashed line to beaconing device/proximally configurable device 130, where device 130 receives the directed beam.

Method 400 proceeds to step 404, which includes receiving, at the targeted one of a plurality of proximally configurable devices, instruction information contained within the directed beam, wherein the instruction information instructs the targeted one of a plurality of proximally configurable devices to enter into a configuration mode. For example, the directed beam is received by the beaconing devices where it determines that instruction information is contained within the directed beam. Therefore, the configuration process is initiated by the receipt of instruction information by the beaconing device that instructs the beaconing device to enter a configuration mode. In addition, a beaconing device may optionally be set to observe instruction information within the directed beam only if the strength or power level of the directed beam is above a certain pre-defined threshold. In another example, the beaconing device can enter the configuration mode based on the receipt of a directed beam with a strength or power level greater than a threshold, without detecting or decoding instruction information.

Method 400 proceeds to step 406, which includes the receiving, at the targeted one of a plurality of proximally configurable devices, configuration information associated with a context, wherein the targeted one of the plurality of proximally configurable devices is in the configuration mode. For example, the directed beam contains configuration information that is associated with a context, as previously discussed, which is received by the beaconing device.

III. EXAMPLE COMPUTER SYSTEM IMPLEMENTATION

Aspects of the present invention shown in FIGS. 1-4, or any part(s) or function(s) thereof, may be implemented using hardware, software modules, firmware, tangible computer readable media having instructions stored thereon, or a combination thereof and may be implemented in one or more computer systems or other processing systems.

Figure 5:
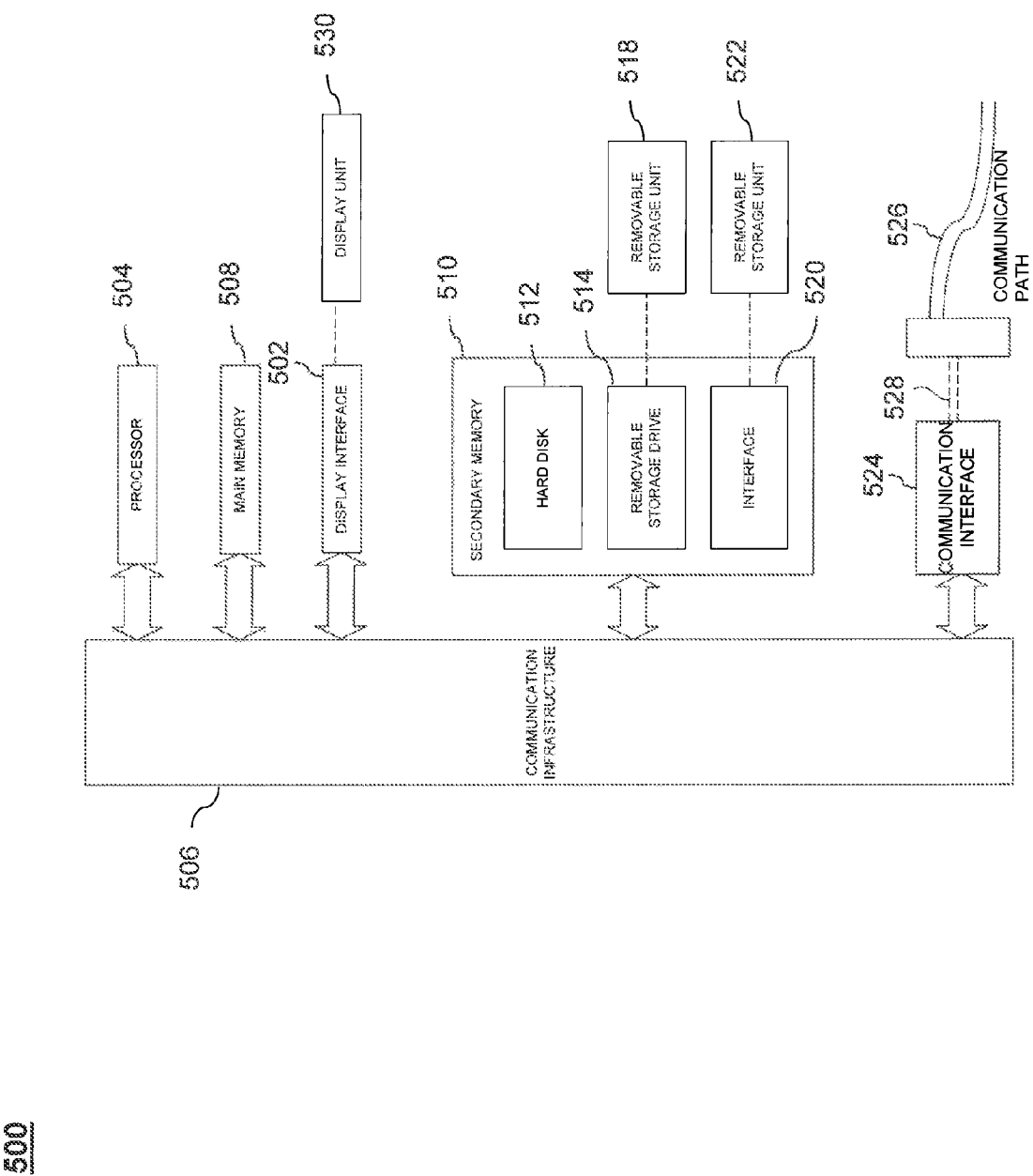
FIG. 5 is a diagram of an example computer system in which embodiments can be implemented.

FIG. 5 illustrates an example computer system 500 in which embodiments, or portions thereof, may by implemented as computer-readable code. For example, portions of system 200, e.g., mobile communication device 250, portions of proximal device configuration tool 210, and portions of proximally configurable devices 220, 230 and 240, may be implemented in computer system 500 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-4.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 500. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, removable storage drive 514. Removable storage drive 514 may include a floppy disk drive, a magnetic tape drive, an optical disk drive, a flash memory, or the like. The removable storage drive 514 reads from and/or writes to a removable storage unit 518 in a well known manner. Removable storage unit 518 may include a floppy disk, magnetic tape, optical disk, etc. which is read by and written to by removable storage drive 514. As will be appreciated by persons skilled in the relevant art, removable storage unit 518 includes a computer usable storage medium having stored therein computer software and/or data.

Computer system 500 (optionally) includes a display interface 502 (which can include input and output devices such as keyboards, mice, etc.) that forwards graphics, text, and other data from communication infrastructure 506 (or from a frame buffer not shown) for display on display unit 530.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communication interface 524. Communication interface 524 allows software and data to be transferred between computer system 500 and external devices. Communication interface 524 may include a modem, a network interface (such as an Ethernet card), a communication port, a PCMCIA slot and card, or the like. Software and data transferred via communication interface 524 may be in the form of signals, which may be electronic, electromagnetic, optical, or other signals capable of being received by communication interface 524. These signals may be provided to communication interface 524 via a communication path 526. Communication path 526 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communication interface 524. Such computer programs, when executed, enable computer system 500 to implement the present invention as discussed herein. In particular, the computer programs, when executed, enable processor device 504 to implement the processes of the present invention, such as the stages in the method illustrated by flowchart 300 of FIG. 3 discussed above. Accordingly, such computer programs represent controllers of the computer system 500. Where the invention is implemented using software, the software may be stored in a computer program product and loaded into computer system 500 using removable storage drive 514, interface 520, and hard disk drive 512, or communication interface 524.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

IV CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for configuring a proximally configurable beaconing device, comprising:
   generating an optical directed beam at a targeted one of a plurality of proximally configurable beaconing devices, wherein the targeted one of the plurality of proximally configurable beaconing devices can receive the optical directed beam;
   sending instruction information contained within the optical directed beam, wherein the instruction information instructs the targeted one of a plurality of proximally configurable beaconing devices to enter into a configuration mode; and
   sending configuration information associated with a context within the optical directed beam to the targeted one of the plurality of proximally configurable beaconing devices when the targeted one of the plurality of proximally configurable beaconing devices is in the configuration mode,
   wherein the context is associated with an object of interest,
   wherein the targeted one of a plurality of proximally configurable beaconing devices is not attached to the object of interest; and
   wherein the targeted one of a plurality of proximally configurable beaconing devices is configured to wirelessly transmit the configuration information associated with a context as a beacon tag over an area adjacent to the object of interest.

2. The method of claim 1, wherein the targeted one of a plurality of proximally configurable beaconing devices is located on a ceiling, a wall, or a floor.

3. The method of claim 1, wherein the context comprises inventory based information.

4. The method of claim 1, wherein the context comprises pricing based information.

5. The method of claim 1, wherein the context comprises location based information.

6. The method of claim 1, further comprising:
   receiving confirmation information from the targeted one of a plurality of proximally configurable beaconing devices that the configuration mode has been entered.

7. The method of claim 1, further comprising:
   receiving confirmation information from the targeted one of a plurality of proximally configurable beaconing devices that the sent configuration data was applied to the targeted one of a plurality of proximally configurable beaconing devices correctly.

8. The method of claim 1, further comprising:
   receiving context based information from the targeted one of a plurality of proximally configurable beaconing devices.

9. The method of claim 8, wherein the receiving is accomplished through the use of a mobile communication device.

10. The method of claim 1, wherein the sending of instruction information contained within the optical directed beam is performed when the targeted one of the of the plurality of proximally configurable beaconing devices detects a power level of the optical directed beam exceeding a threshold level.

11. The method of claim 1, further comprising charging the targeted one of a plurality of beaconing devices by transferring an amount of power through the optical directed beam.

12. The method of claim 1, wherein the plurality of beaconing devices are functionally substantially indistinguishable from each other prior to configuring.

13. The method of claim 1, wherein the sent configuration information is unique for the targeted one of a plurality of beaconing devices compared to a non-targeted one of the plurality of beaconing devices.

14. A method for configuring a proximally configurable beaconing device, comprising:
   receiving, at a targeted one of a plurality of proximally configurable beaconing devices, an optical directed beam generated by a configuration device;
   receiving, at the targeted one of a plurality of proximally configurable beaconing devices, instruction information contained within the optical directed beam, wherein the instruction information instructs the targeted one of a plurality of proximally configurable beaconing devices to enter into a configuration mode; and
   receiving, at the targeted one of a plurality of proximally configurable beaconing devices, configuration information within the optical directed beam associated with a context when the targeted one of the plurality of beaconing devices is in the configuration mode,
   wherein the context is associated with an object of interest,
   wherein the targeted one of a plurality of proximally configurable beaconing devices is not attached to the object of interest, and
   wherein the targeted one of a plurality of proximally configurable beaconing devices is configured to wirelessly transmit the configuration information associated with a context as a beacon tag over an area adjacent to the object of interest.

15. The method of claim 14, wherein the targeted one of a plurality proximally configurable beaconing devices is located on a ceiling, a wall, or a floor.

16. The method of claim 14, further comprising:
   sending confirmation information from the targeted one of a plurality of proximally configurable beaconing devices that the configuration mode has been entered.

17. The method of claim 14, further comprising:
   sending confirmation information from the targeted one of a plurality of proximally configurable beaconing devices that the received configuration data was applied to the targeted one of a plurality of proximally configurable beaconing devices correctly.

18. The method of claim 14, further comprising:
sending context based information from the targeted one of a plurality of proximally configurable beaconing devices.

19. The method of claim 14, wherein the entering into a configuration mode is based on the power level of the optical directed beam exceeding a threshold level.

20. The method of claim 14, further comprising
charging the targeted one of a plurality of proximally configurable beaconing devices by transferring an amount of power through the optical directed beam.

21. The method of claim 14, wherein the plurality of proximally configurable beaconing devices are functionally substantially indistinguishable from each other prior to configuring.

22. The method of claim 14, wherein the received configuration information is unique to the targeted one of a plurality of proximally configurable beaconing devices compared to a non-targeted one of the plurality of proximally configurable beaconing devices.

23. The method of claim 18, wherein the sending is actively configured.

24. The method of claim 18, wherein the sending is passively configured.

25. A system for configuring a beaconing device, comprising:
a configuration tool configured to generate an optical directed beam; and
a targeted one of a plurality of proximally configurable beaconing devices,
wherein the targeted one of the plurality of proximally configurable beaconing devices is configured to receive the optical directed beam,
wherein the configuration tool is configured to send instruction information contained within the optical directed beam,
wherein the instruction information instructs the targeted one of a plurality of proximally configurable beaconing devices to enter into a configuration mode,
wherein the configuration tool sends configuration information associated with a context within the optical directed beam to the targeted one of the plurality of proximally configurable beaconing devices, when the targeted one of the plurality of proximally configurable beaconing devices is in the configuration mode,
wherein the context is associated with an object of interest,
wherein the targeted one of a plurality of beaconing devices is not attached to the object of interest, and
wherein the targeted one of a plurality of proximally configurable beaconing devices is configured to wirelessly transmit the configuration information associated with a context as a beacon tag over an area adjacent to the object of interest.

26. The system of claim 25, wherein the targeted one of a plurality of beaconing devices is located on a ceiling, a wall, or a floor.

27. The system of claim 25, wherein the configuration tool is configured to receive confirmation information from the targeted one of a plurality of proximally configurable beaconing devices that the configuration mode has been entered.

28. The system of claim 25, wherein the configuration tool is configured to receive confirmation information from the targeted one of a plurality of proximally configurable beaconing devices that the sent configuration data was applied to the targeted one of a plurality of beaconing devices correctly.

29. The system of claim 25, further comprising:
a mobile communication device configured to receive context based information from the targeted one of a plurality of proximally configurable beaconing devices.

30. The system of claim 25, wherein a power level of the directed beam exceeds a threshold level in order to send instruction information contained within the directed beam.

31. The system of claim 25, wherein the targeted one of a plurality of proximally configurable beaconing devices is charged by a transferring of an amount of power through the optical directed beam.

32. The system of claim 25, wherein the plurality of proximally configurable beaconing devices are functionally substantially indistinguishable from each other prior to configuring.

33. The system of claim 25, wherein the sent configuration information is unique for the targeted one of a plurality of beaconing devices compared to a non-targeted one of the plurality of beaconing devices.

* * * * *